United States Patent [19]

Mayer et al.

[11] 4,107,665
[45] Aug. 15, 1978

[54] APPARATUS FOR CONTINUOUS VARIATION OF OBJECT SIZE ON A RASTER TYPE VIDEO SCREEN

[75] Inventors: Steven T. Mayer, Auburn; Ronald E. Milner, Grass Valley, both of Calif.

[73] Assignee: Atari, Inc., Sunnyvale, Calif.

[21] Appl. No.: 809,314

[22] Filed: Jun. 23, 1977

[51] Int. Cl.² ............................................. G06K 15/20
[52] U.S. Cl. ......................... 340/324 AD; 273/85 G; 273/DIG. 28
[58] Field of Search ................... 273/DIG. 28, 85 G; 340/324 AD

[56] References Cited

U.S. PATENT DOCUMENTS

| | | | |
|---|---|---|---|
| 3,614,767 | 10/1971 | Carrell | 340/324 AD |
| 3,911,420 | 10/1975 | Lampson | 340/324 AD |
| 3,952,296 | 4/1976 | Bates | 340/324 AD |
| 4,015,846 | 4/1977 | Runte et al. | 340/324 AD |
| 4,016,362 | 4/1977 | Bristow et al. | 273/DIG. 28 |
| 4,020,484 | 4/1977 | Caspari | 340/324 AD |

*Primary Examiner*—David L. Trafton
*Attorney, Agent, or Firm*—Flehr, Hohbach, Test, Albritton & Herbert

[57] ABSTRACT

Apparatus for continuous variation of object size on a raster type video screen in a television game. The input of a voltage controlled oscillator is varied by a game controller. The output of the oscillator drives horizontal and vertical counters at rates corresponding to the object size. These counters provide respectively horizontal and vertical addresses to a picture generator read only memory. The faster the counters are incremented the smaller the object; and with regard to the vertical address, horizontal lines of the picture are actually skipped in order to reduce the size of the object.

10 Claims, 7 Drawing Figures

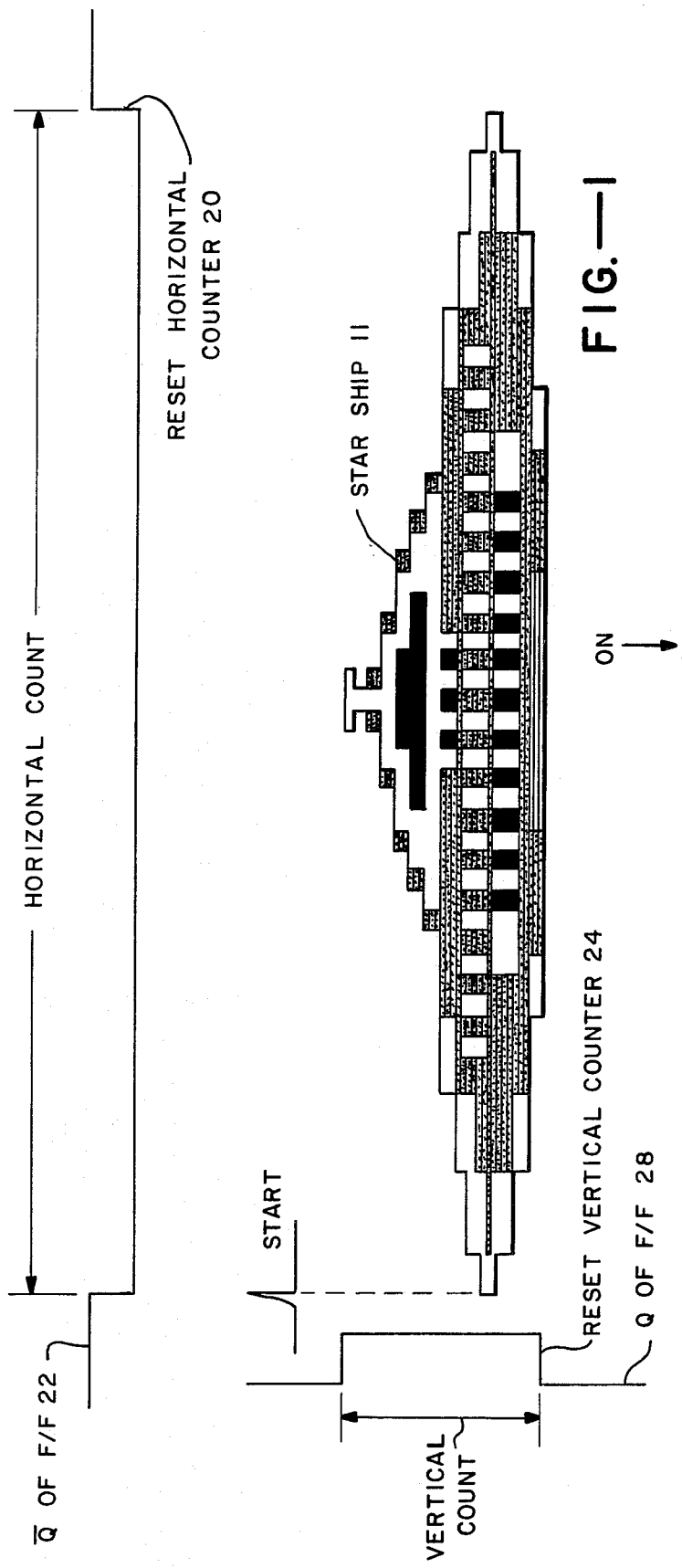
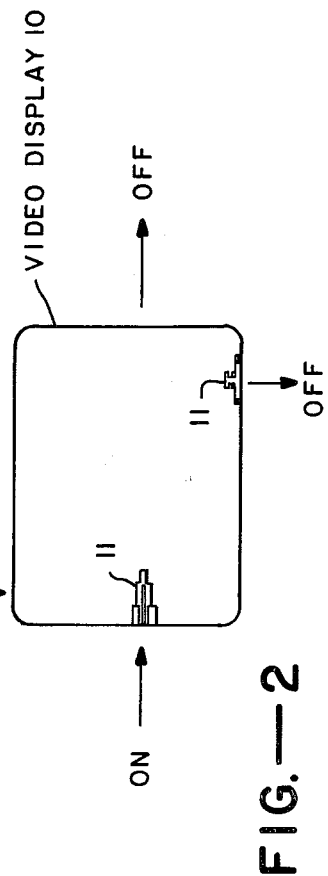
FIG.—1
FIG.—2

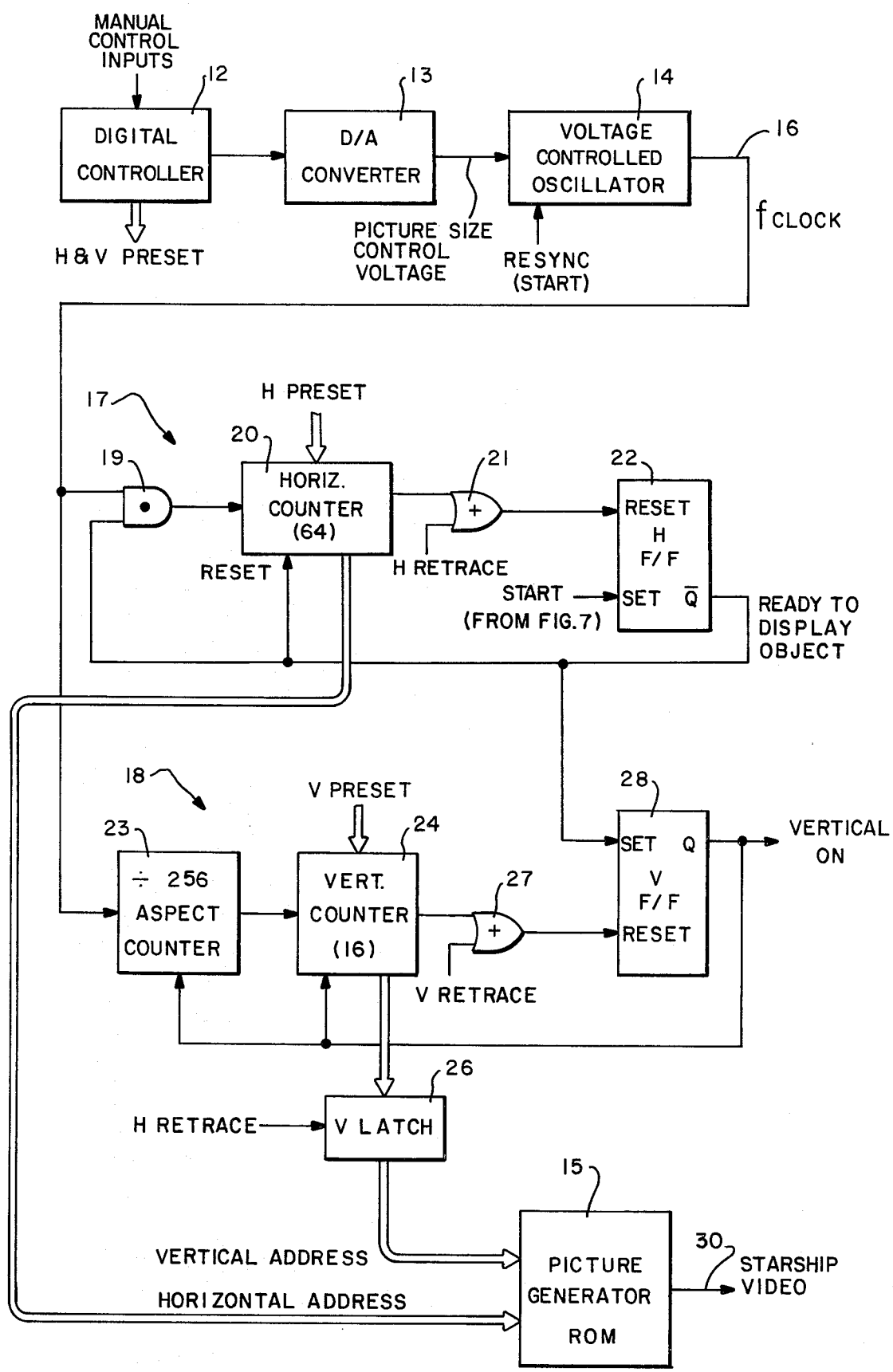
FIG.—3

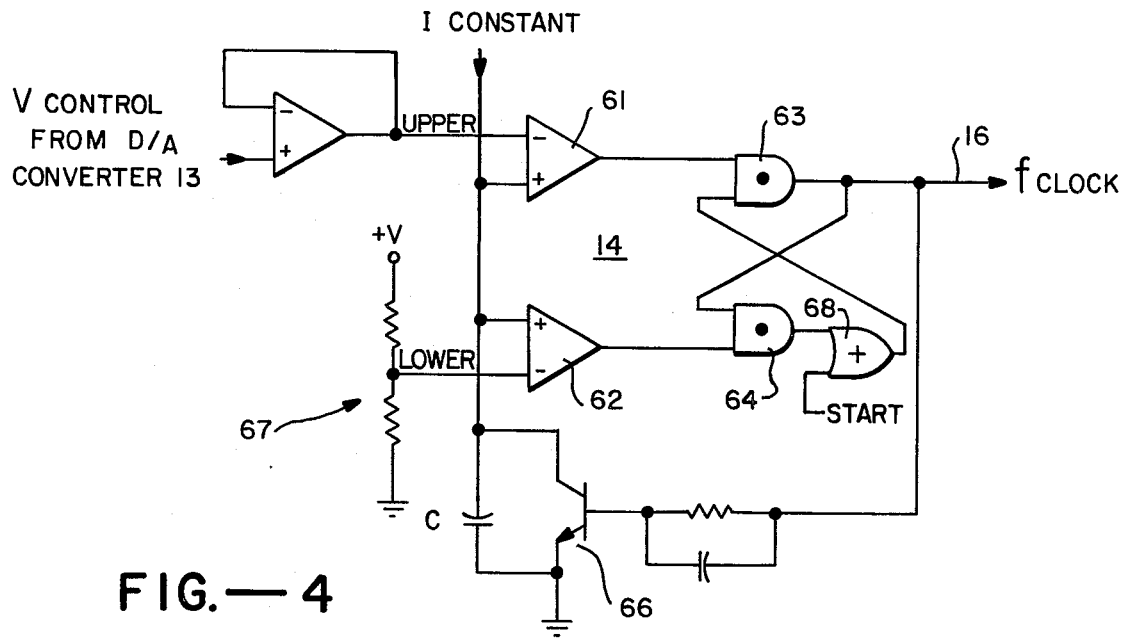
FIG.—4
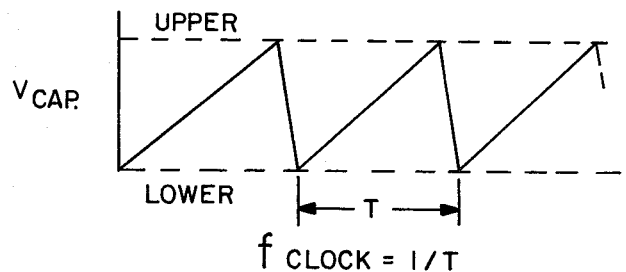
FIG.—5
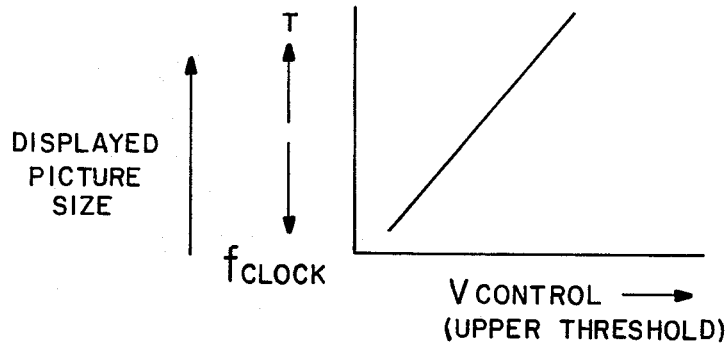
FIG.—6

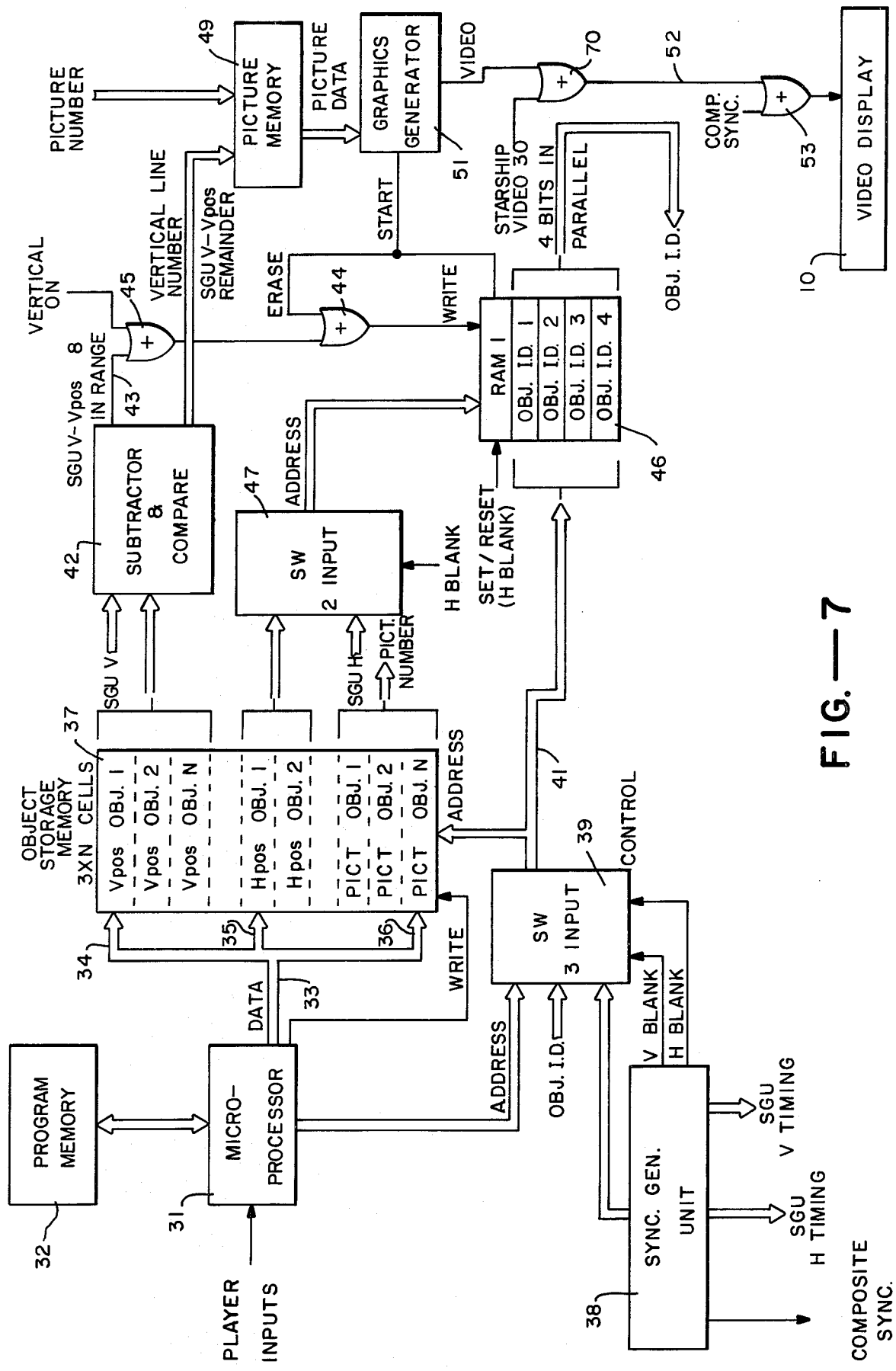
FIG.—7

APPARATUS FOR CONTINUOUS VARIATION OF OBJECT SIZE ON A RASTER TYPE VIDEO SCREEN

BACKGROUND OF THE INVENTION

The present invention is directed to apparatus for continuous variation of object size on a raster type video screen and more specifically to apparatus which is suitable for electronic video games.

In various video games it is desirable to simulate a sense of perspective or distance by changing the size of a displayed object. For example, in a duck shooting game this has been accomplished by providing eight different picture sizes so that the duck grows smaller as it flies away. In another game, where passing ships are torpedoed, the torpedo grows smaller in three different picture sizes as it move away toward the ship. By changing the size in discrete steps, the illusion of perspective is significantly reduced.

OBJECTS AND SUMMARY OF THE INVENTION

It is, therefore, an object of the present invention to provide apparatus for continuous variation of object size on a raster type video screen.

It is another object of the invention to provide the foregoing where the object is only partially on the video display screen.

In accordance with the above objects there is provided apparatus for continuous variation of object size on a roster type video display screen comprising control means for determining the movement of the object on the video display screen and its size. Picture memory means store an object having a predetermined number of horizontal lines. Means are responsive to the control means for causing the stored object to be displayed on the video screen. Object size is varied by selecting only a variable portion of the horizontal lines in proportion to the desired object size.

BRIEF DESCRIPTION OF THE DRAWINGS

FIG. 1 is a simplified elevational view of a typical object whose size is to be varied;

FIG. 2 is a diagrammatic view of a video display screen showing the object of FIG. 1 coming on the screen and going off the screen;

FIG. 3 is a block circuit diagram embodying the present invention; and

FIG. 4 is a detailed circuit diagram of a portion of FIG. 3;

FIG. 5 is a waveform useful in understanding FIG. 4;

FIG. 6 is a graph showing an operating characteristic of FIG. 4; and

FIG. 7 is a block diagram of the motion control circuitry used in conjunction with the present invention.

DETAILED DESCRIPTION OF THE PREFERRED EMBODIMENT

Referring to FIGS. 1 and 2, the present invention is directed to a video game involving a starship 11 in simulated form in FIG. 1. It has 16 horizontal lines of picture information and 64 horizontal resolution elements. As is apparent, the starship 11 is constructed of redundant horizontal lines so that by asynchronously throwing away or eliminating several of the 16 lines the size of the object can be reduced vertically without eliminating any critical detail. The starship 11 comes onto the screen at either the left edge or top and goes off the video display screen at either the bottom or right edge, FIG. 2 illustrates two of these conditions.

Control for the foregoing is shown in FIG. 3 where a digital controller 12 or microprocessor receives manual control inputs from, for example, the player (or from other control circuitry) to determine the movement of the object and therefore its corresponding size. Controller 12 drives a digital to analog converter 13 which in turn drives a voltage controlled oscillator 14 whose period is proportional to the picture size control voltage from converter 13. The output signal on line 16 of the oscillator has a frequency $f_{clock}$ which is inversely proportional to the object size which is determined by the manual control inputs in combination with controller 12. As will be explained below, the higher the frequency or the shorter the period, the smaller the object. The signal on line 16 drives both a horizontal address circuit 17 and a vertical address circuit 18 which address a picture generator read-only memory (ROM) 15 which produces a video signal on line 30. ROM 15 has stored in it the 16 lines of addressable horizontal information illustrated in FIG. 1. And when a horizontal line is addressed by the vertical address input it is properly split up into its 64 horizontal resolution elements by a horizontal address counter 20.

The horizontal address circuit 17 includes the horizontal counter 20 driven by the frequency signal on line 16 through AND gate 19. The counter counts up to 64, the number of horizontal resolution elements, to provide the horizontal address to ROM 15 as indicated. Upon completion of that count, signifying that a complete line of picture data has be outputted, or upon a horizontal retrace the OR gate 21 produces an output which resets a horizontal SET/RESET flip-flop 22. The setting of the flip-flop is accomplished by a "start" signal from a motion circuit disclosed in FIG. 7 which in effect indicates the left hand edge of the object to be displayed. The start input to horizontal flip-flop 22 also resynchronizes VCO 14 so that the left edge of the object is uniform and straight. A true indication on the $\bar{Q}$ output indicates the object is ready to be displayed. This $\bar{Q}$ output is the other coincidence input to the gate 19 which allows the counter to start counting. A reset of the $\bar{Q}$ output provides a reset for the horizontal counter 20 which will occur if the horizontal retrace occurs before the counter finishes counting as for example indicated in FIG. 2 where the object goes off the right-hand edge of the screen. Finally counter 20 has a horizontal preset input which is preset where, again referring to FIG. 2, an object is coming on the screen at the left hand edge. Such information is supplied by digital controller 12. The preset allows starting the picture display at any point in the picture data, truncating the left part of the picture and thus simulating the starship entering or leaving the picture to the left.

Vertical address circuit 18 includes a divide by 256 aspect counter 23 which divides down the signal on line 16 and compensates for the time difference between the horizontal and vertical scan rates. The number 256 is, the normalized ratio of the horizontal resolution element time to that of the vertical time chosen for the particular graphics used in this embodiment. Counter 23 drives vertical counter 24 which has a count of 16 and provides through vertical latch circuit 26 the vertical addresses to ROM 15. The vertical latch circuit is controlled by the horizontal retrace interval and thus senses every horizontal retrace interval. The vertical of the ROM produced video picture display is only changed during one of these intervals. If the output of vertical counter 24 is in effect a frequency greater than the vertical scan rate of the raster, such asynchronous condition causes some of the address lines (that is the 16 lines of the object in the ROM) to be skipped and thus display a smaller object. If 24 is slower than the V scan rate, the same line of graphic information is repeated as necessary as illustrated in FIG. 1. In a manner similar to that of horizontal circuit 17 a vertical flip-flop 28 is of the SET/RESET type and is reset through an OR gate 27 either upon a full count of counter 24 or upon the vertical retrace interval being reached first. The latter would occur if as illustrated in FIG. 2 the object 11 were going off the bottom of the video display screen 10. The output of OR gate 27 resets vertical flip-flop 28 actuating the Q output which resets the counter and also resyncs the aspect counter 23.

Vertical counter 24 has a vertical preset input from controller 12 which provides for the object 11 coming on the screen from the top; in other words, both the horizontal and vertical counters 18 and 24 can be preset to start the picture part way through on the left or top. On the other hand, going off the screen from the right side or bottom is handled by the horizontal and vertical retrace resets from the OR gates 21 and 27.

Because of the redundancy of the starship object 11 as illustrated in FIG. 1 skipping of certain horizontal lines as stored in ROM 15 will not appreciably reduce the visual resolution of the object.

In order to provide a direct and linear relationship between displayed picture or object size and the picture size control voltage, V control, as shown in FIG. 6 a VCO 14 as illustrated in FIG. 4 must be used. Here the period of the output signal is directly and linearly proportional to the control voltage. This is accomplished by use of a pair of comparators 61 and 62 which drive a pair of cross coupled AND gates 63, 64. The output of gate 63 is line 16 ($f_{clock}$) which is also feed back to the base of transistor 66 which is used to discharge capacitor, C. The capacitor is charged from a constant current source and connected to the noninverting terminals of comparators 61, 62. The inverting terminals are respectively connected to the picture size control voltage from D/A converter 13 designated "upper" threshold and to a resistive bias circuit 67 which provide a "lower" or baseline threshold. The start pulse through OR gate 68 forces the state of C and therefore 61–64 to a known point in the waveform of FIG. 5.

The charging voltage across the capacitor, $V_{CAP}$, is shown in FIG. 5 where it is apparent that a change in the upper threshold (the picture size control voltage) causes a direct or linear change in the period, T, of $f_{clock}$. Thus as illustrated in FIG. 6 the normal nonlinear one "1" I/T relationship is avoided. The voltage period relationship is linear over the full picture size control range.

The foregoing circuitry of FIG. 3 is applicable to a single object on the video display 10. Actual control of the motion of that object and other objects, such as asteroids, is provided by the circuit of FIG. 7 which is disclosed and claimed in copending application Ser. No. 706,121, filed July 6, 1976, entitled "Method for Generating A Plurality of Moving Objects on a Video Display Screen" in the name of the same inventors and assigned to the present assignee.

In FIG. 7 the microprocessor 31 is equivalent to digital controller (and in this embodiment is the same) 12 and also receives the player inputs to control objects number 1 through n. The actual start input is shown as driving graphics generator 51 and would also be connected to the flip-flop 22 of FIG. 3 and OR gate 68 of FIG. 7. Microprocessor 31 is connected to a program memory 32 to provide for overall control of the various logic circuits. It stores the horizontal and vertical address of several objects to be displayed and in addition assigns an object identification number to each viz., 1, 2 ... n where n might be as many as 16. The vertical and horizontal position data provides the left hand edge of the displayed object with the remainder of the object being generated by logic circuitry to be described below. The horizontal and vertical position data is read out of the microprocessor on its data line 33 which is connected to three different sections 34, 35 and 36 of an object storage random access memory (RAM) 37.

Object storage memory 37 contains predetermined memory locations of 1 through n for the horizontal and vertical positions of the object and in addition picture information. The memory 37 includes 3 × n cells or memory locations. The position in the memory determines the display priority of the object if more than one object occupies the same screen position. The position is represented by eight bits of data which however can easily be expanded for higher resolution. Since the physical memory location corresponds to the object identification number the address output of the microprocessor 31 when addressing memory 37 corresponds to the object identification number. The picture number output from memory section 36 is ORed with the variable size generator video 30 at OR gate 70.

Overall control of the timing of the microprocessor 31 ccomes from the sync generator unit 38 (SGU) which has the outputs of vertical and horizontal (V and H) timing and blanking and composite sync all of which correspond to normal signals associated with a television type video display. The vertical and horizontal blanking output of sync generator 38 control the switch 39 which accepts the object ID and the addresses from microprocessor 31 and connects them via the address line 41 to the object storage RAM 37.

In operation during the vertical blanking interval microprocessor 31 addresses the object storage memory 37 and writes in vertical, horizontal and picture data for any or all objects.

During the horizontal retrace or blanking interval of each line of the video display 10 the object storage RAM 37 is scanned by timing signals from the SGU and the vertical position for each object is compared to the vertical count of the sync generator 38. If the difference, $\Delta$, is within a preset number such as 8 corresponding to the vertical size of the object to be displayed, this is sensed by the compare and subtractor unit 42. This unit provides an in-range output on line 43 through an inclusive OR gate 44 to a horizontal RAM memory 46. But differing from the above copending application, when the variable size display picture has started it is continued until the vertical display is completed. OR gate 45 in line 43 accomplishes this by its other "vertical on" input from Q of flip-flop 28 (FIG. 3). Memory 46 will eventually contain or have stored in it object identification numbers. In actual practice, the horizontal random access memory 46 stores in each of 256 possible locations corresponding to the actual physical location of the beam image to be displayed five bits of information which consist of a write token and a four bit object ID. The four bit object ID provides a binary count of 0 through 15 or will accommodate 16 different moving objects in the present implementation. Storage in the proper horizontal location in the memory 46 is accomplished through switch 47 which accepts the horizontal positions from object storage 37.

Storage of information in the horizontal memory 46 (H RAM) is done during the horizontal blanking interval as discussed above. If any objects stored in vertical position is within Δ television lines of the vertical timing, the stored horizontal position (H POS) of the object becomes the address (see line 48 from switch 47) for the H RAM 46. The data written into the H RAM is the address (object ID) of the object storage RAM supplied by line 41 from switch 39 with the first position of the RAM, i.e., RAM 1, being written with a "1" taken indicating an object to be displayed is present in this horizontal location.

In operation, as discussed, during the vertical retrace interval object memory 37 is updated; during horizontal retrace H RAM 46 is updated. Finally during the active television line the following takes place. The H RAM is scanned in time sequence by the horizontal timing signals. If a "1" or display token is detected in RAM 1, the graphics generator 51 is started by the START signal. RAM 1 is also written with a φ to clear it through gate 44 thus preparing the RAM for the next line. The object memory 37 is accessed by the object ID output into switch 39. The appropriate picture number is routed to picture memory 49 along with the V POS data. The above is repeated on a line by line basis until a complete frame is displayed and vertical retrace again occurs.

A picture memory 49 defines picture data which when transferred to a graphics generator 51 is converted to video data on line 52 through summer 53 (also driven by composite sync) drives video display 10. Picture memory 49 receives the difference or remainder of the stored vertical position (V POS) subtracted from the actual vertical line number (SGUV) this remainder being indicative of the vertical line of the object to be displayed. In addition, the picture number from memory 37 provides the object ID along with rotational information. Picture memory 49 is generally a programmable read only memory but may be random access in order to allow easy programming to vary the type of game.

All the foregoing discussion of FIG. 7, of course, mainly relates to the display of the other objects of the video game which need not have their size varied.

Thus apparatus for the continuous variation of object size on a raster type video screen has been provided.

What is claimed is:

1. Apparatus for continuous variation of object size on a raster type video screen comprising: control means for determining the movement of said objects on said video screen; variable oscillator means responsive to said control means for generating a signal having a period proportional to the object size as determined by said control means; picture memory means for storing an object having a predetermined number of addressable horizontal lines; counter means driven by said signal from said oscillator means for generating addresses for said picture memory means; vertical latch means for sensing during a horizontal retrace interval of said raster the address contained in said counter means and causing said corresponding addressable line to provide video data on the next horizontal line of said raster whereby if said period is less than the vertical scan rate of said raster said vertical latch means will asynchronously cause some addressable lines of said object to be skipped to therefore display a smaller object.

2. Apparatus as in claim 2 where said addressable horizontal lines of said stored object are redundant.

3. Apparatus as in claim 1 where said variable oscillator means includes a voltage controlled oscillator.

4. Apparatus as in claim 3 where said variable oscillator means includes a digital controller responsive to said control means and a digital to analog converter for converting the digital output of said controller to an analog voltage for driving said voltage controlled oscillator.

5. Apparatus as in claim 1 together with a horizontal counter driven by said variable oscillator means for counting a predetermined number of horizontal resolution elements in a horizontal line while addressing said picture memory means.

6. Apparatus as in claim 5 including means for resetting said horizontal counter in response to a horizontal retrace interval of said raster.

7. Apparatus as in claim 1 including means for resetting said counter means in response to a vertical retrace interval of said raster.

8. Apparatus as in claim 5 where said counter means and said horizontal counter both include means for being preset to an initial count.

9. Apparatus as in claim 3 where said voltage controlled oscillator produces said signal having a period directly and linearly proportional to object size and to an analog control voltage produced by said control means.

10. Apparatus for continuous variation of object size on a raster type video display screen, comprising: picture memory means for storing an object having a predetermined number of horizontal lines; control means for determining the movement of said object on said video display screen and its size, and means responsive to said control means for causing said stored object to be displayed on said video display screen and varying said object size by selecting only a variable portion of said horizontal lines in proportion to the desired object size.

* * * * *